United States Patent [19]
Moore

[11] 3,892,320

[45] July 1, 1975

[54] BOAT TRAILER WITH MULTIPLE ROCKING BOOM SUSPENSION

[76] Inventor: Benjamin T. Moore, Box 4513, Fort Worth, Tex. 76106

[22] Filed: Mar. 29, 1974

[21] Appl. No.: 456,170

[52] U.S. Cl. .............................. 214/84; 280/414 R
[51] Int. Cl. .............................................. B60p 3/10
[58] Field of Search ..................... 214/84, 505, 506; 280/414 R

[56] References Cited
UNITED STATES PATENTS

| | | | |
|---|---|---|---|
| 2,889,946 | 6/1959 | Holsclaw ................................ | 214/84 |
| 3,058,756 | 10/1962 | Holsclaw ......................... | 280/414 R |
| 3,104,770 | 9/1963 | Calkins .................................. | 214/84 |
| 3,512,667 | 5/1970 | Calkins ............................. | 214/84 X |
| 3,693,813 | 9/1972 | Calkins ................................. | 214/84 |
| 3,756,434 | 9/1973 | Johnson ................................ | 214/84 |
| 3,785,677 | 1/1974 | Calkins ........................... | 280/414 R |
| 3,812,986 | 5/1974 | Rogers .................................. | 214/84 |

*Primary Examiner*—Leo Friaglia

[57] ABSTRACT

A roller type boat trailer in which a large number of rollers are maintained in contact with the hull of a boat during loading or launching whereby high localized stress loads are avoided, and all rollers, including double cradle frame rollers, are supported from only two pivot axis on the frame whereby loads are always evenly distributed, even where over-the-road shocks are encountered.

14 Claims, 7 Drawing Figures

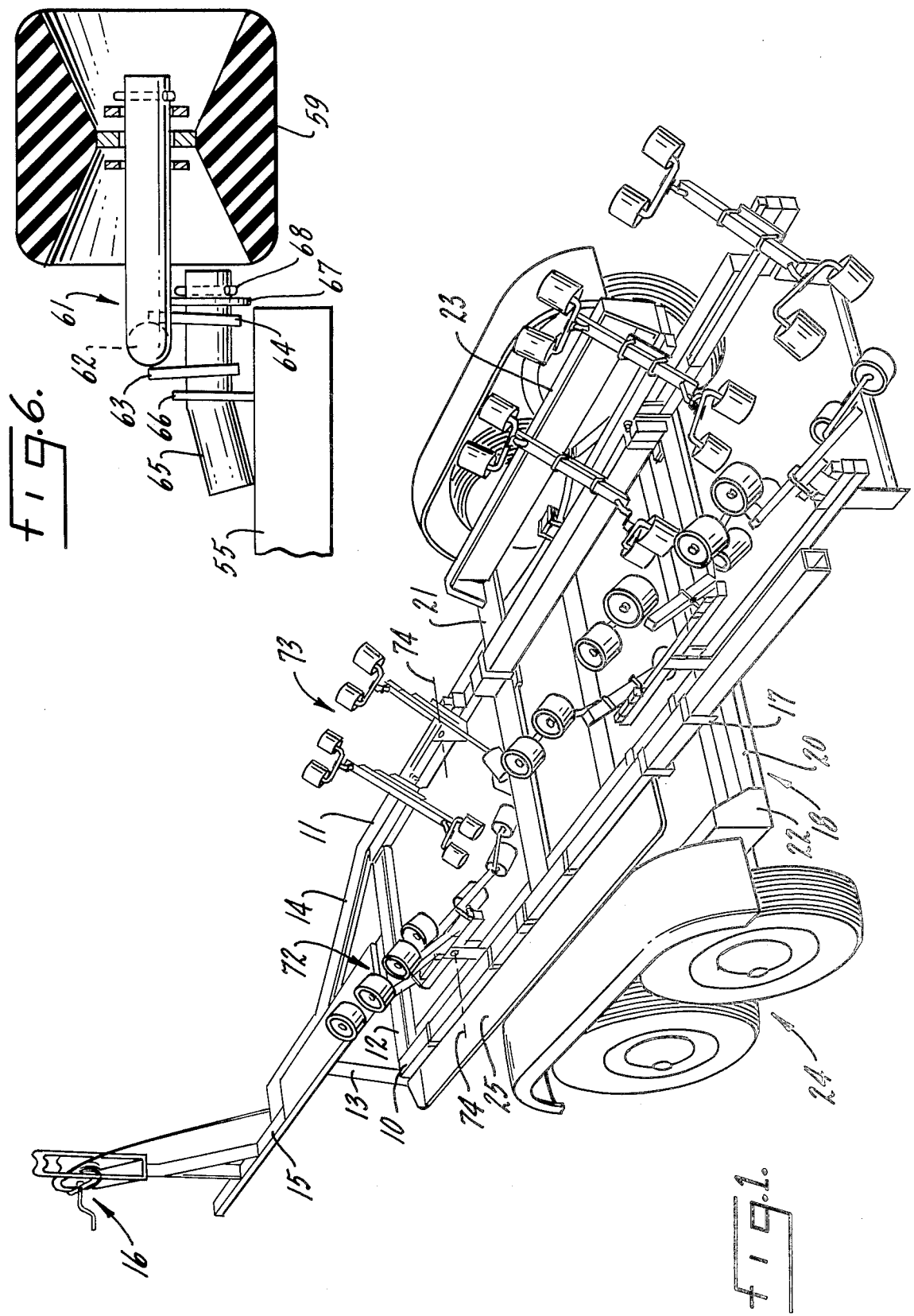

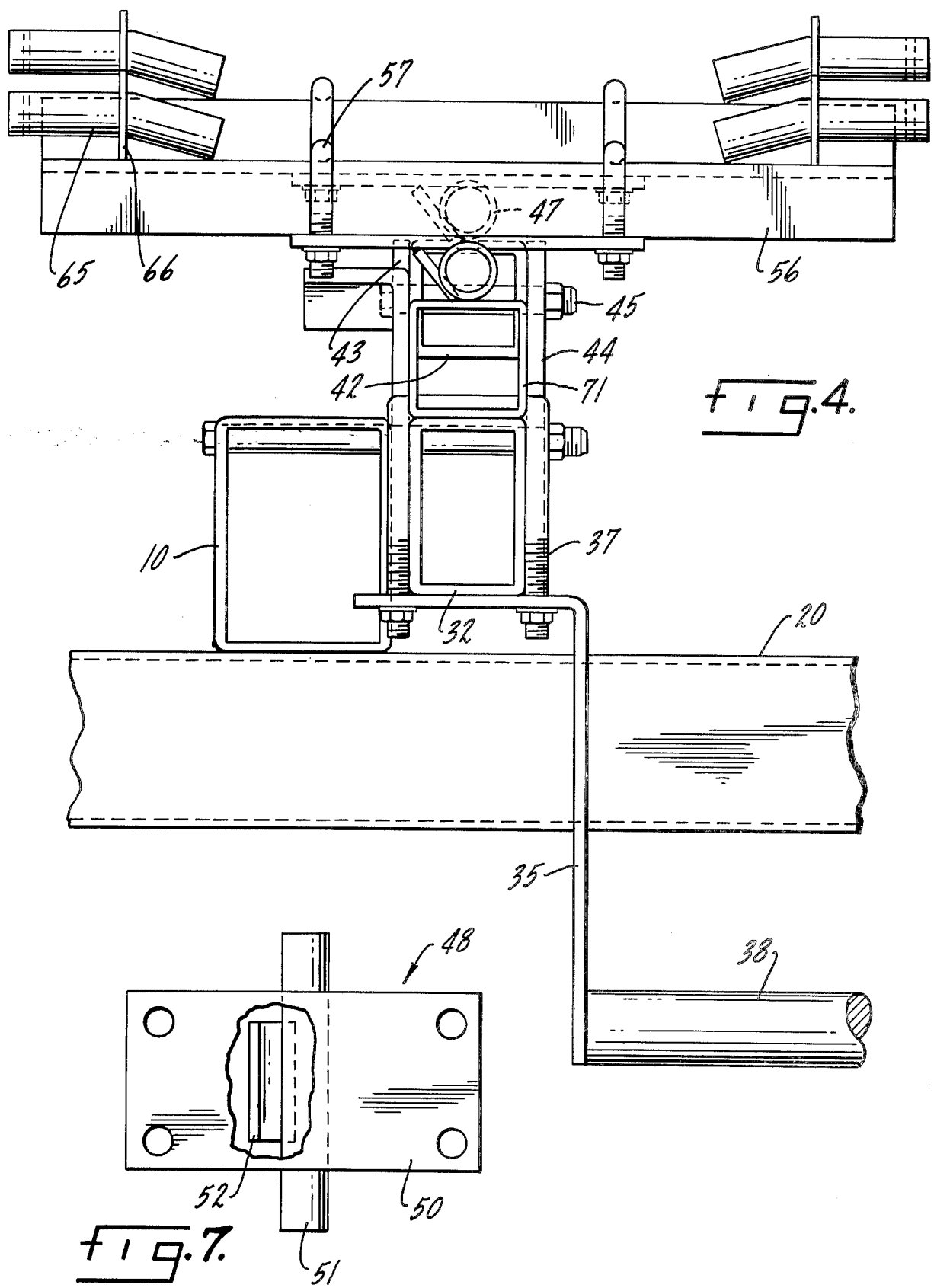

BOAT TRAILER WITH MULTIPLE ROCKING BOOM SUSPENSION

This invention relates to trailers especially adapted for carrying, loading and launching pleasure boats, and specifically to a roller type trailer in which a large number of rollers are brought into contact with a boat hull during loading prior to contact of the bow end of the boat with forwardly located rollers, whereby a maximum number of hull support points are provided and the possibility of excessive stresses on the hull during loading is minimized. Further, after loading, all rollers always carry a substantially identical load, assuming normal placement of the boat on the trailer. of A major, and continuing, goal of boat trailer builders is to provide maximum support to the boat hull during loading since it is at this time that some of the greatest stress loads are placed on the boat hull. Thus in the normal loading operation one relatively small area of the entire hull area is often required to support a large portion of the weight of the boat, particularly when the trailer has not been backed far enough into the water at the loading site. Although this condition may exist for only an instant of time the stress concentration in the small localized area fo the boat hull in contact with the trailer support member can be extremely high, and repeated subjection of the same area of the boat hull to such high stresses can eventually cause failure of the stressed locality. Attempts have been made to remedy this condition by use of a breaking frame trailer or a sub-frame which is tiltable with respect to the main frame, the breaking portion of the frame or the sub-frame carrying hull supporting members. However, invariably the angle of tilt of the breaking frame or the tilting sub-frame is insufficient to always preclude the possibility of high stress loads in a localized area of the hull, and this condition may be aggravated when the hull supporting members are rollers instead of pads.

Another problem common to many trailers is the failure of the hull supporting system to always distribute load evenly from hull contact point to contact point, and at the same time ensure substantially instantaneous re-distribution of load when the trailer is subjected to over-the-road shocks. This problem can be aggravated when there are numerous support connections between the hull contacting support members and the trailer frame bed.

SUMMARY OF THE INVENTION

Accordingly the primary object of this invention is to provide a trailer having a substantial number of hull supporting members arranged to make load supporting engagement with the hull of a boat at all times as a boat is loaded onto the trailer from the water, whereby high localized stress points in the hull due to support of the boat at only one or a few support points is avoided or minimized.

Another object is to provide a trailer as described above in which the hull support members are rollers.

A further object is to provide a trailer in which the load during over-the-road travel is always substantially uniformly distributed over all hull support points, including during subjection to road shocks.

Yet a further object is to provide a trailer as above described in which the support members in contact with the hull are rollers.

Another object is to provide a trailer as above described in which all hull contacting rollers are supported from only two pivot axes locations on the trailer frame bed, whereby maximum cushioning effect to the supported load is provided.

Other objects and advantages will become apparent from reading the following exemplary description thereof.

DESCRIPTION OF DRAWING

The invention is illustrated more or less diagrammatically in the accompanying drawing, wherein FIG. 1 is a perspective view of a trailer incorporating the novel features of this invention;

FIG. 4 is an end view to an enlarged scale taken substantially along the line 4—4 of FIG. 3 with parts omitted for clarity;

FIG. 6 is an end view of a roller assembly taken substantially along the line 6—6 of FIG. 5; and FIG. 7 is a top plan view of a hinge pin and plate weldment with parts broken away for clarity.

Like reference numerals will be used to refer to the same or identical parts throughout the following description of the invention.

DESCRIPTION OF SPECIFIC EMBODIMENTS

Figure 2:
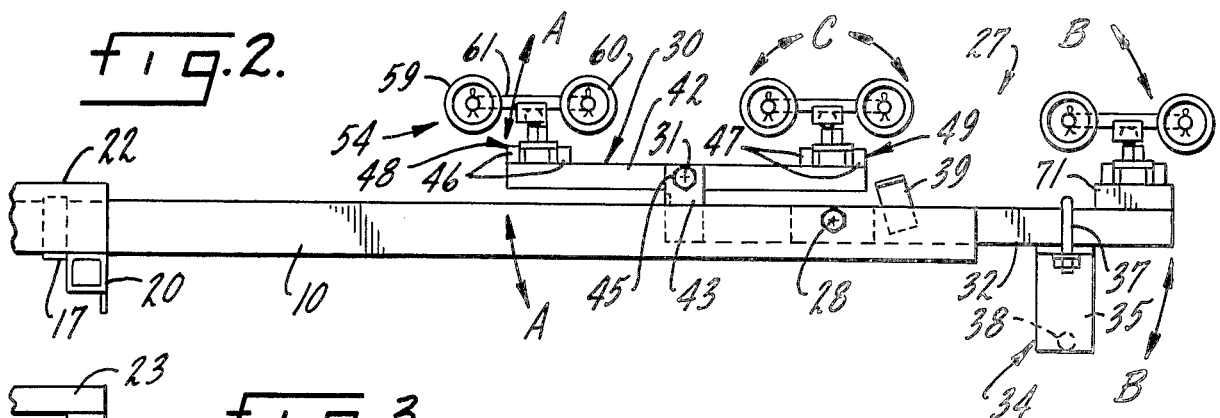
FIG. 2 is an elevational view of the rear end portion of the trailer of FIG. 1.

An over-the-road trailer specially adapted for carrying boats is illustrated in FIG. 1. The trailer includes a main frame comprised of left rail 10 and right side rail 11. A front cross-member is indicated at 12, tongue braces at 13 and 14, a tongue at 15 and means for receiving and steadying the bow portion of a boat at 16. The frame is connected by any suitable fastening means, such as U-straps 17, to an under-carriage indicated generally at 18. The under-carriage includes transverse cross-members 20 and 21 and longitudinally disposed side spring rails 22 and 23. A wheel and spring assembly, indicated generally at 24, is connected by any suitable means to the side spring rails 22 and 23 of the under-carriage. Since the particular mode of mounting the wheel and spring assemblies does not form an integral part of the invention it will not be further illustrated or described. It should be noted further that although a tandem wheel assembly has been chosen for purposes of illustration, the invention is not confined to any particular number of wheels. Optional features, such as a step-board 25, may also be provided.

Figure 3:
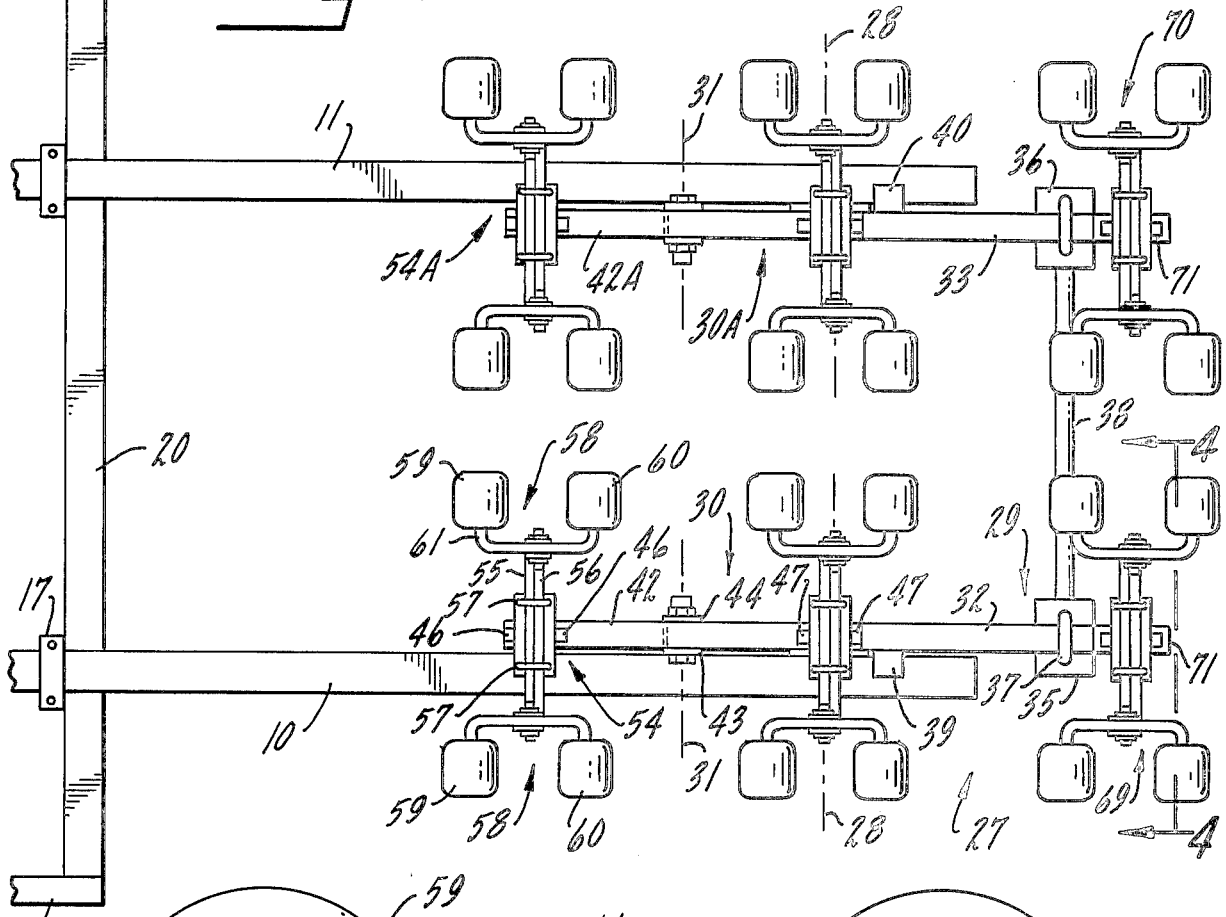
FIG. 3 is a top view of the structure shown in FIG. 2.

Referring specifically to FIGs. 1 and 3 it will be noted that the side rails 10 and 11 extend a substantial distance rearwardly of the under-carriage transverse member 20, and carry no cross-brace members in the rearwardly extending span.

A double rocking action cradle frame assembly is indicated generally at 27, the cradle frame assembly being mounted to the side rails 10 and 11 for pivotal movement with respect thereto about a pivot axis indicated at 28.

The double rocking action cradle frame assembly 27 consists, essentially, of a primary rocker arm assembly or boom indicated generally at 29, and a pair of secondary rocker arm assemblies or booms indicated generally at 30 and 30A. Each secondary rocker arm assembly is pivotally connected to the primary rocker arm assembly for pivotal movement about a pivot axis indicated generally at 31.

The primary rocker arm assembly includes a pair of rocker arms 32, 33 which are connected for movement in unison by a rocker arm stabilizer indicated generally at 34. The stabilizer consists essentially of a pair of inverted L-shaped plates 35, 36, each of which is connected at its upper flange section by U-bolts 37 to the rear end portion of an associated one of the primary rocker arms 32 and 33. A cross-pipe 38 is welded or otherwise suitably secured to the lower end portions of the L-shaped mounting brackets 35, 36 to thereby ensure movement in parallel unison of the primary rocker arm assembly about its frame mounting axis 28. A pair of pivot stops are indicated at 39 and 40 carried, respectively, by the left and right rocker arms 32 and 33, the pivot stops serving to limit the extent of clockwise movement of the primary rocker arm assembly about its pivot axis 28.

The secondary rocker arm assemblies 30, 30 A are identical and accordingly only assembly 30 will be described.

Secondary rocker arm assembly 30 includes an elongated, longitudinally oriented roller assembly support boom 42 of any suitable configuration, such as the box shape illustrated best in FIG. 4. The secondary support boom 42 is pivotally connected to the forward end of its associated left rocker arm 32 by a pair of pivot plates 43, 44 which are welded or otherwise suitably secured at their lower end portions to the left rocker arm 32, and a pivot pin 45.

Pairs 46, 47 of hinge pin holders are welded at each end of the secondary rocker assembly support arm 42. The hinge pin holders may be short circular rings which are welded or otherwise suitably secured to their associated end portion of the support arm 42.

A hinge pin and plate assembly is indicated at 48, 49. Each hinge pin and plate assembly includes a roller assembly mounting plate 50, shown best in FIG. 7, to which a hinge pin 51 is secured by welding or other suitable means. A hinge stop is indicated at 52, the hinge stop being welded to the underside of the mounting plate 50 and the lower surface of hinge pin 51. The hinge stop prevents counter-clockwise rotation of the mounting plate 50, and the roller assemblies carried by it, to be hereinafter described, past the position illustrated in FIG. 4, but permits clockwise rotation to the extent permitted by the engagement of mounting plate 50 with the inside edge of support boom 42.

A roller assembly, indicated generally at 54, is secured to each mounting plate 50 at each end of secondary roller assembly support boom 42. Since the roller assemblies 54 are identical one to the other only one will be described.

Figure 5:
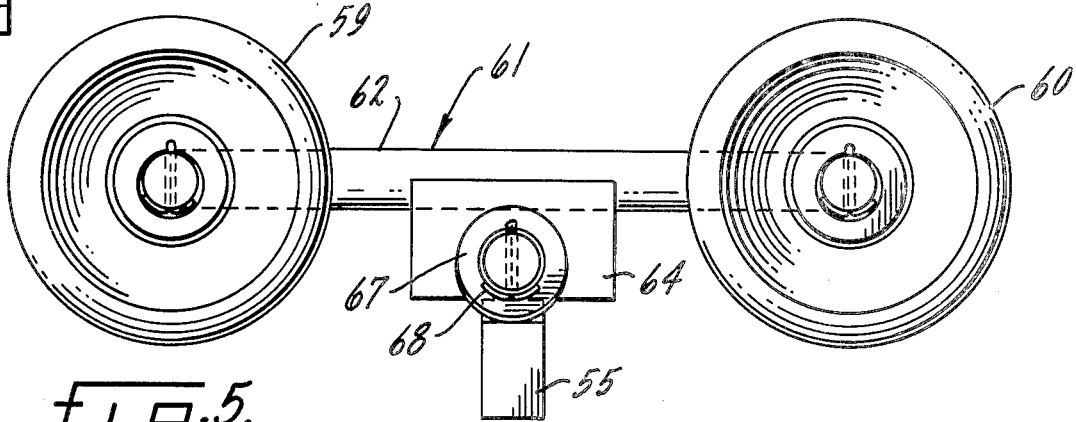
FIG. 5 is a detailed view, taken substantially along the line 5—5 of FIG. 6, illustrating the mode of mounting a roller assembly on its support bar.

Each roller assembly includes a pair of roller support arms 55, 56 which are securely fastened in side by side relationship to the roller assembly mounting plate 50 by U-bolts 57 or other suitable fasteners. Each roller support arm carries, at its working end, a roller assembly indicated generally at 58. Roller assembly 58 includes two rollers 59, 60, mounted, respectively, on the legs of a generally U-shaped mounting shaft 61. The bight portion 62 of shaft 61 has secured thereto a pair of pivot plates 63, 64 by welding or other suitable means, the pivot plates having aligned apertures so as to be received on the outer end portion of a round roller support shaft 65. The roller shaft 65 is rigidly secured to the outer end portion of its associated support arm 55 by any suitable means such as a flat washer 66, see particularly FIGS. 4 and 5, which is welded to the support arm 55. Outward movement of the roller assembly on the support shaft 65 is prevented by any suitable means, such as a loose washer 67 and cotter key 68. From FIG. 5 it will be noted that the roller assembly 58 is free to slide longitudinally along the leg of the U-shaped roller shaft 65 on which it is mounted between washers 66 and 67, which thereby provides position adjustability to the roller assembly to accommodate changes in the contour of the supported hull.

It will be noted by reference to FIGS. 2 and 3 that the roller assemblies carried by each end of each secondary roller assembly support boom 42, 42A is identically mounted to its associated boom, with the roller assemblies on the left secondary boom 42 being restrained against counter-clockwise movement beyond the illustrated position of FIG. 4, and the roller assemblies on right support boom 42A being restrained against clockwise movement past a similar level position.

The rear roller assemblies 69, 70 carried by the left and right rocker arms 32, 33 respectively are identical in all respects to the afore-described roller arm assemblies 54, except that each is mounted on a roller support block 71 so as to place the pivot axes for roller assembly 69 at substantially the same level as the pivot axes for roller assemblies carried by the secondary support boom as illustrated best in FIG. 2.

The forward roller assemblies indicated generally at 72, 73 are identical in construction to the secondary rocker arm assemblies just described. Further, the forward roller assemblies 72 and 73 are mounted to the left and right side rails 10 and 11 by pivot plates substantially identical in all functional respects to the pivot plates 43 and 44 by which the secondary rocker assembly booms are mounted to the forward end of the left and right rocker arms 32, 33. Accordingly, a detailed description of the forward roller assemblies is not required except to say that the pivot points of the roller assemblies should be axially aligned.

The use and operation of the invention are as follows.

Assume that a boat is floating at the water's edge and the trailer of FIG. 1 has been backed to the water's edge in a conventional manner.

As the boat is pulled forwardly by means of a conventional winch carried by the bow supporting and steadying structure 16, the forward end of the hull makes initial contact with the rear roller assemblies 69 and 70. Since the primary rocker arms 32 and 33 which carry the primary roller assemblies 69 and 70 are tiltable in a clockwise direction, as viewed in FIG. 2, until the rocker arm pivot stops 39 and 40 strike side rails 10 and 11, the rocker arms will be sufficiently depressed to easily receive the bow of the boat. Movement of the primary rocker arms is indicated by the arrows B of FIG. 2. Since the cross-pipe or spacer 38 and its associated mounting plates 35, 36 connect the primary rocker arms 32, 33 one to the other, the rocker arms will move in parallel unison about the main pivot axis 28. Additional contour adjustment is provided by the individual U-shaped roller assemblies which are rotatable about their roller support shafts 65 until their pivot plates 63, 64 strike against their associated support arm 55. Maximum positional variation for the rollers of the rear roller assemblies 69, 70, is thereby provided for the boat hull as it makes initial contact with the trailer.

As the winch continues to be operated and the boat moves forwardly on the trailer, the hull then will contact the secondary rocker assembly support booms 42, 42A. Since each of the roller assemblies 54 on the secondary booms are substantially identical in construction and operation to the roller assemblies 69, 70 it will be apparent that the rollers in the roller assemblies will always be in a position to make load supporting contact with the incoming boat hull. It will be particularly noted that since the roller assemblies carried by the secondary rocker booms project outwardly beyond the side rails 10 and 11, the side rails provide in effect limit means beyond which the secondary rocker arm booms will not flex irrespective of the position of the primary, generally U-shaped rocker boom.

Thus, at the time when the boat hull is in contact with all rollers and each of the six roller assemblies carried, collectively, by the secondary rocker booms and the primary rocker boom, the hull will be supported at twenty-four support points. This large number of contact points provides maximum hull support as contrasted to currently available roller cradle type trailers.

As the boat continues to move forward on the trailer under the pulling force of the winch or other means each one of the twenty-four rollers in the double rocking boom assembly will remain in substantially equal load bearing contact with the boat hull. This action is attributable to the rocking actions illustrated by the arrows A, B and C of FIG. 2, together with the pivotability of each roller assembly by virtue of its hinge pin mounting about the hinge pin holders carried by the secondary rocker booms 41, 42 and the roller support blocks 71.

As the boat continues to move forward the twenty-four rollers associated with the double rocking boom assembly will continue to make load supporting contact with the hull. When the hull approaches and contacts the forward roller assemblies 72 and 73, the pivotal mounting of said roller assemblies will again enable the sixteen roller associated with each assembly to make load bearing engagement with the hull in such fashion that the load eventually transmitted to the common pivot axis of the forward roller assemblies is uniformly supported.

After securement of the boat to the trailer, and assuming normal placement of the boat on the trailer and the compatibility between the length of the boat and the length of the trailer, over-the-road shocks will be minimized by the unique assembly here disclosed.

Thus, it will be noted that all loads are transmitted to the side rails 10 and 11 through only two axes, namely the forward axis 74 and the primary rocker boom pivot axis 28.

With respect to the load supported by the double rocking boom assembly at the rear of the trailer, it will be noted that because of the pivotal mounting of roller assemblies 54, 54A, about pivot axes 31, any loads imposed on the secondary rocker arm or boom assemblies will be equally divided so that the moment arms about axis 31 will always balance. At the same time, the moment arms taken about the primary rocker boom axis 28 will always equalize because of the pivotal mounting of the entire structure about axis 28.

Thus each roller will, irrespective of variations in hull contour or shocks derived from over-the-road travel, substantially instantaneously balance out so that the stress imposed on the hull from any roller assembly at any point in time is substantially equal to the stress imposed on the hull by any other roller assembly at that point in time.

The result will be a very smooth, uniformly cushioned load which, when taken in conjunction with the maximum stress dispersion during loading, provides maximum cushioned support in a roller type trailer.

It will be understood by those skilled in the art that modifications may be made without departing from the essential spirit and scope of the invention. For example, more or fewer rollers may be used in each individual roller assembly. Further, the double rocking boom concept associated with the rear end portion of the trailer may be likewise adapted to the forward end portion, the only requirement being that load on any individual roller be eventually transmitted to only one of two main frame points of connection of the roller assembly or assemblies to the frame. Accordingly it is intended that the scope of the invention be limited not by the scope of the foregoing description, but solely by the scope of the hereinafter appended claims when interpreted in light of the pertinent prior art.

I claim:

1. For use in an over-the-road trailer, a rocking cradle load support assembly, said assembly including, in combination, a rigid, generally U-shaped primary rocker arm structure, means for pivotally connecting said U-shaped primary rocker arm structure to a base structure for pivotal movement about a horizontal axis located transversely with respect to the longitudinal axis of the primary rocker arm structure, and, a pair of secondary rocker arm structures, each secondary rocker arm structure including a rocker arm, means for pivotally connecting said rocker arm to a leg of the U-shaped primary rocker arm structure, and a pair of load contacting support assemblies, one support assembly being located on each side of the point of connection of the rocker arm to its associated leg of the U-shaped primary rocker arm structure, each support assembly being pivotable about both a generally horizontal longitudinal axis, and a generally horizontal transverse axis, whereby it can be adjustable to conform, moment to moment, to variations in the contour of the supported load.

2. The rocking cradle load support assembly of claim 1 further including a set of primary rocker arm load contacting support assemblies, said set including a pair of load contacting support assemblies, one of said pair being mounted on each leg of the generally U-shaped primary rocker arm structure and being generally aligned with the support assemblies carried by the secondary rocker arm which is pivotally mounted on the same leg of the U-shaped primary rocker arm structure.

3. The rocking cradle load support assembly of claim 2 further characterized in that each of said support assemblies mounted on the legs of the generally U-shaped primary rocker arm structure is pivotable about both a generally horizontal longitudinal axis and a generally horizontal transverse axis whereby it is adjustable, to conform, moment to moment, to variations in the contour of the supported load.

4. The rocking cradle load support assembly of claim 1 further characterized in that
each load contacting support assembly is a roller assembly.

5. The rocking cradle load support assembly of claim 3 further characterized in that
each load contacting support assembly is a roller assembly.

6. The rocking cradle load support assembly of claim 5 further characterized in that
each roller assembly includes a shaft structure disposed transversely to the rocker arm to which it is pivotally connected, and
roller means carried at each end portion of said shaft structure.

7. The rocking cradle load support assembly of claim 6 further characterized in that
each roller means includes a pair of individual rollers, said rollers being mounted to provide only rolling friction to a load as it is moved onto and off said rocking cradle support assembly.

8. In an over-the-road trailer,
a frame structure supported by a wheeled carriage,
said frame structure including a frame having a pair of parallel, generally horizontally oriented, transversely spaced side rails,
a rocking cradle load support assembly, said load support assembly including, in combination,
a rigid, generally U-shaped primary rocker arm structure,
means for pivotally connecting each leg of said U-shaped primary rocker arm structure to an associated side rail of said frame structure for pivotal movement about a horizontal axis located substantially perpendicularly with respect to the parallel side rails,
a pair of secondary rocker arm structures,
each secondary rocker arm structure including a rocker arm,
means for pivotally connecting said rocker arm to a leg of the U-shaped primary rocker arm structure, and
a pair of load contacting support assemblies, one support assembly being located on each side of the point of connection of the rocker arm to its associated leg of the U-shaped primary rocker arm structure,
each support assembly being pivotable about both a generally horizontal longitudinal axis, and a generally horizontal transverse axis whereby it can be adjustable to conform, moment to moment, to variations in the contour of the supported load.

9. The over-the-road trailer of claim 8, further including
a set of primary rocker arm load contacting support assemblies,
said set including a pair of load contacting support assemblies,
one of said pair being mounted on each leg of the generally U-shaped primary rocker arm structure and being generally aligned with the support assemblies carried by the secondary rocker arm which is pivotally mounted on the same leg of the U-shaped primary rocker arm structure.

10. The over-the-road trailer of claim 9 further characterized in that
each of said support assemblies mounted on the legs of the generally U-shaped primary rocker arm structure is pivotable about both a generally horizontal longitudinal axis and a generally horizontal transverse axis whereby it is adjustable, to conform, moment to moment, to variations in the contour of the supported load.

11. The over-the-road trailer of claim 10 further characterized in that
each load contacting support assembly is a roller assembly.

12. In an over-the-road trailer,
a frame structure supported by a wheeled carriage,
said frame structure including a frame having a pair of parallel, generally horizontally oriented, transversely spaced side rails,
a rocking cradle load support assembly, said load support assembly including, in combination,
a rigid, generally U-shaped primary rocker arm structure,
means for pivotally connecting each leg of said U-shaped primary rocker arm structure to an associated side rail of said frame structure for pivotal movement about a horizontal axis located substantially perpendicularly with respect to the parallel side rails,
a first pair of secondary rocker arm structures,
each secondary rocker arm structure of said first pair including a rocker arm,
means for pivotally connecting each of said rocker arms to a leg of the U-shaped primary rocker arm structure, and
a pair of load contacting support assemblies, one support assembly being located on each side of the point of connection of the rocker arm to its associated leg of the U-shaped primary rocker arm structure,
each support assembly being pivotable about both a generally horizontal longitudinal axis and a generally horizontal transverse axis whereby it can be adjustable to conform, moment to moment, to variations in the contour of the supported load,
a second pair of secondary rocker arm structures,
each of said second pair including a rocker arm,
means for pivotally connecting each of said rocker arms of said second pair to an associated side rail of the frame structure in transversely spaced relation to one another,
a pair of load contacting support assemblies, one support assembly being located on each side of the point of connection of each rocker arm of the said second pair to its associated side rail of the frame structure,
the support assemblies of each second pair of secondary rocker arm structures being generally aligned with the support assemblies of the primary rocker arm structure whereby a plurality of generally longitudinally aligned support assemblies are provided for each side of a load carried by the trailer.

13. The over-the-road trailer of claim 12 further including
a pair of load contacting support assemblies, one support assembly of each of the last mentioned pair being mounted on each leg of the generally U-shaped primary rocker arm and being generally aligned with the support assemblies carried by the secondary rocker arm which is pivotally mounted on the same leg of the primary rocker arm.

14. The over-the-road trailer of claim 13 further characterized in that each load contacting support assembly is a roller assembly.

* * * * *